United States Patent
Bakal et al.

(10) Patent No.: US 6,838,107 B1
(45) Date of Patent: Jan. 4, 2005

(54) METHOD OF PREPARING AN IMPROVED LOW-CALORIE, LOW-FAT FOOD FOODSTUFF

(75) Inventors: Abraham I. Bakal, Parsippany, NJ (US); Shiochi Nanbu, Kanagawa (JP); Toshiaki Muraoka, Tokyo (JP)

(73) Assignee: Towa Chemical Industry Co., Ltd., Tokyo (JP)

( * ) Notice: Subject to any disclaimer, the term of this patent is extended or adjusted under 35 U.S.C. 154(b) by 430 days.

(21) Appl. No.: 07/770,054

(22) Filed: Oct. 1, 1991

Related U.S. Application Data

(63) Continuation-in-part of application No. 07/330,670, filed on Mar. 30, 1989, now abandoned.

(51) Int. Cl.[7] .......................... A21D 10/00; A23D 9/00
(52) U.S. Cl. ...................... 426/549; 426/548; 426/572; 426/603; 426/608
(58) Field of Search .............................. 426/658, 549, 426/572, 603, 548

(56) References Cited

U.S. PATENT DOCUMENTS

| | | | |
|---|---|---|---|
| 3,717,711 A | | 2/1973 | Miller |
| 3,918,986 A | | 11/1975 | Hiraiwa |
| 3,957,976 A | | 5/1976 | Sugimoto |
| 4,024,290 A | | 5/1977 | Layton |
| 4,049,833 A | * | 9/1977 | Gannis et al. ................ 426/93 |
| 4,675,200 A | | 6/1987 | Serpelloni et al. |
| 4,717,570 A | * | 1/1988 | Polizzano .................... 426/94 |
| 4,772,482 A | * | 9/1988 | Olinger et al. .............. 426/548 |
| 4,849,023 A | * | 7/1989 | Devos et al. ................. 127/40 |

OTHER PUBLICATIONS

Japanese publication cited in Japanese counterpart application 63–177765.
Opposition papers filed in counterpart EPO application.

* cited by examiner

*Primary Examiner*—Leslie Wong
(74) *Attorney, Agent, or Firm*—Smith, Gambrell & Russell

(57) ABSTRACT

This relates to foodstuffs containing maltitol. More particularly, this invention relates to improved fat-containing foodstuffs, wherein the improvement includes the partial or total replacement of the fat by a taste effective amount of maltitol.

19 Claims, No Drawings

METHOD OF PREPARING AN IMPROVED LOW-CALORIE, LOW-FAT FOOD FOODSTUFF

CROSS-REFERENCE TO RELATED APPLICATION

This application is a continuation-in-part of U.S. patent application Ser. No. 07/330,670, filed Mar. 30, 1989, now abandoned.

FIELD OF THE INVENTION

This invention relates to foodstuffs containing maltitol. More particularly, this invention relates to foodstuffs containing an effective amount of maltitol as fat replacement and a method for their preparation.

BACKGROUND OF THE INVENTION

Maltitol is a sugar alcohol approved for use in many European countries and in Japan. Maltitol is available in syrup or powder form and is typically used as a replacement for sugar in sugarless products. Such sugarless products has consumer appeal for the following reasons:

(1) Maltitol metabolism does not require insulin, making it an acceptable sugar substitute for diabetics;
(2) Since maltitol is not fermented by the oral microflora, it does not contribute to tooth decay; and
(3) Maltitol has superior taste quality in comparison to sorbitol, the leading sugar alcohol. In addition, the sweetness potency of maltitol is higher than that of sorbitol.

In Japan, maltitol is used extensively as a total replacement of sugar in a variety of foods, including candies, chocolate, table-top sweetener, salad dressings, etc. It is preferred over sorbitol in many of these applications because of its sweet taste.

Also, the scientific literature clearly indicates that a strong relationship exists between food and health. A recently published Surgeon General's report on nutrition and health identified several dietary components which play an important role in the prevention of disease. Prominent among recommendations made by the Surgeon General was the reduction of fat consumption, especially the consumption of saturated fat. High consumption of fat has been linked to high blood cholesterol and increased risk of coronary heart disease. In addition, each gram of fat contains about 9 calories, versus 4 calories for a gram of protein or carbohydrate. Thus, the caloric contribution of fat to food products is significantly higher than other food components.

Fat plays an important role in the acceptability of foods, in addition to its role as a medium for frying and other processing. Fat-containing foods are more acceptable than those lean in fat because fat provides creamy, rich mouthfeel and related organoleptic properties, which highly impact consumer acceptance of foods.

All of the above clearly indicates that a need exists for ingredients which can substitute fats in food formulations while maintaining the organoleptic properties, i.e., creamy mouthfeel of these products.

OBJECTS OF THE INVENTION

It is an object of the invention to provide improved foodstuffs.

It is also an object of the invention to provide improved foodstuffs containing an effective amount of maltitol as a fat replacement.

It is a further object of the invention to provide a method for preparing improved, low-calorie, low-fat foodstuffs containing an effective amount of maltitol as a fat replacement.

It is a yet further object of the invention to provide a method for preparing improved, low-calorie, low-fat foodstuffs wherein the improvement comprises the partial or total replacement of the fat by an effective amount of maltitol composition containing from 75 to 99% by weight, preferably from 88.5 to 99% by weight, of maltitol, the maltitol composition imparting the creamy mouthfeel of fat.

These and other objects of the invention will become more apparent in the discussion below.

DETAILED DESCRIPTION OF THE INVENTION

It has been unexpectedly found that maltitol is useful as a sweetener or sweetener replacement as well as a fat replacement, in foodstuffs. More particularly, the invention herein is directed to improved sweetened or fat-containing foodstuffs wherein the improvement comprises an effective amount of maltitol composition containing from about 75 to 99% by weight, preferably from about 88.5 to 99% by weight, of dry maltitol.

Maltitol, also known as maltitol powder or hydrogenated glucose syrup powder, is the generic name for 4-O-α-D-gluco-pyranosyl-D-glucitol. The chemical structure of maltitol is as follows:

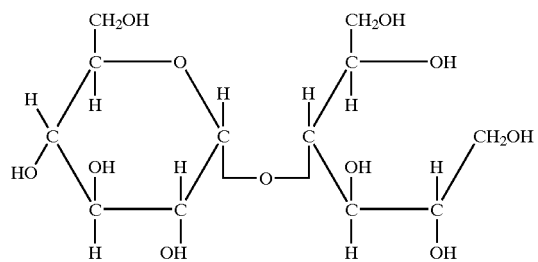

This structure has been confirmed by nuclear magnetic resonance and infrared absorption studies, which showed in particular that the 1,4-glucosidic linkage is definitely of the alpha type. Crystallographic studies have demonstrated that the molecular structure of maltitol is that of a full extended conformation with no intramolecular hydrogen bonds. All nine hydroxyl groups are involved in intermolecular hydrogen bonds and in bifurcated, finite chains. The D-glucopyranosyl moiety has the 4Cl conformation, and the conformation about the C-5/C-6 bond is gauche—gauche. The D-glucitol residue has the bent conformation.

There are several known procedures for preparing maltitol. For example, maltitol can be manufactured by the transition metal catalytic hydrogenation of a high-maltose starch hydrolysate, which is essentially the same basic method used to manufacture sorbitol from high glucose syrups. The hydrogenated syrup is purified by removing the catalyst from the reaction liquid, followed by decolorization with activated carbon and deionization with a suitable ion-exchange resin. The liquid is concentrated to a higher solids content before crystallization. The crystals from the crystallization are pulverized and then dried to a moisture content of 1.5% or less. The dried powder is classified by sieving before packaging. Also, see the procedures for preparing maltitol disclosed in U.S. Pat. Nos. 3,918,986, 3,975,976, and 4,409,041, all of which are incorporated herein by reference.

Maltitol is preferably used in a composition comprising from about 75 to 99% by weight, preferably from about 88.5 to 99% by weight, based upon the total weight of the composition, of hydrogenated disaccharide such as maltitol, from 0 to about 4% by weight of hydrogenated monosaccharide, from about 1 to 11% by weight of hydrogenated trisaccharide, and from about 0 to 10% by weight of hydrogenated tetrasaccharide and/or higher polysaccharide. Maltitol compositions are commercially available under the tradenames Amalty syrup, Amalty, and Amalty MR from Towa Chemical Industry Co., Ltd., Tokyo, Japan.

The maltitol composition can be used either alone or in combination with one or more sugar alcohols, sugars, intense sweeteners, or other materials. Examples of useful sugar alcohols include, for example, xylitol, sorbitol, mannitol, hydrogenated glucose syrup (HGS), hydrogenated starch hydrolyzate (HSH), palatinit, and lactitol. The sugar alcohol component is preferably present in an effective amount of from about 0.5 to 25% by weight, based upon the total weight of the foodstuff. Useful sugars include, for example, xylose, fructose, glucose, sucrose, maltose, lactose, isomaltose, isomalto-oligo-saccharide, isomaltulose (palatinose), high fructose corn syrup, corn syrup (maltodextrin), corn syrup solids, coupling sugar, fructo-oligo-saccharide, galacto-oligo-saccharide, and inverted sugar. The sugar component is preferably present in an effective amount of from about 0.5 to 30% by weight, based upon the total weight of the foodstuff. Useful intense sweeteners include, for example, aspartame, alitame, acesulfame-K, trichlorosucrose (sucralose), stevioside, rebaudioside-A, and saccharine. The intense sweetener component is preferably present in an effective amount of from about 0.1 to 20% by weight, based upon the total weight of the foodstuff. Polydextrose, available from Pfizer, Inc., is representative of the other materials, that is, the non-maltitol substances present. The other materials component is preferably present in an effective amount of from about 0.1 to 25% by weight, based upon the total weight of the foodstuff.

The maltitol composition described herein is preferably used as a partial or total replacement for fat in fat-containing foodstuffs. The fat component could comprise, for example, lard, lipids from cows, fish, or plants, milk fat, butter, cheese, shortening, margarine, or cooking oil or fat. The foodstuffs intended to be covered by this invention include virtually any fat-containing foodstuff know to those skilled in the art. Particular foodstuffs include brownies, pie filling, salad dressings, spreads, cakes, cookies, and powered drink mixes. In addition, maltitol can be used as a sweetener in hard candy and cough drops, sugar substitutes, soft candy, chewing gum, nonstandardized jams and jellies, cookies, and sponge cake.

The maltitol composition would be used in a sufficient or effective amount to partially or totally replace the fat component of a fat-containing foodstuff, to the extent that the foodstuff still has substantially similar organoleptic properties compared to the unsubstituted fat-containing foodstuff. One measure of the effectiveness of the fat substitute is the "mouthfeel" of the resulting product. It is specific intention of the invention that the mouthfeel of the resulting foodstuff have substantially the same if not better mouthfeel than the original, fat-containing foodstuff.

The following examples are intended to illustrate the invention and should not be construed as limiting the invention thereto. In said examples the amount of each component is expressed as % by weight, based upon the total weight of the composition or foodstuff. Also, "DE" stands for dextrose equivalency.

EXAMPLES

Example 1

Salad dressing samples were prepared by mixing the following components:

TABLE I

| | Sample: | | |
|---|---|---|---|
| | Control | #1 | #2 |
| Water | 40.8 | 40.8 | 40.8 |
| Distilled white vinegar | 20.0 | 20.0 | 20.0 |
| Vegetable oil | 30.0 | 15.0 | 15.0 |
| Sugar | 5.0 | 5.0 | 5.0 |
| Salt | 2.0 | 2.0 | 2.0 |
| Garlic powder | 1.0 | 1.0 | 1.0 |
| Onion powder | 0.7 | 0.7 | 0.7 |
| Ground white pepper | 0.1 | 0.1 | 0.1 |
| Xanthan gum (Keltrol T) | 0.3 | 0.3 | 0.3 |
| Potassium sorbate | 0.1 | 0.1 | 0.1 |
| Maltitol | — | 15.0 | — |
| Sorbitol | — | — | 15.0 |
| | 100.0 | 100.0 | 100.0 |

In Sample #1, 50% of the oil was replaced with maltitol, and in Sample #2, 50% of the oil was replaced with sorbitol.

The salad dressing samples were evaluated for viscosity and sensory perceptions. The results were as follows:

TABLE II

| | Sample | | |
|---|---|---|---|
| | Control | #1 | #2 |
| Viscosity* | 2260 | 2800 | 2080 |
| Creaminess (0–8, none - extensive) | 5.7 | 6.8** | 4.7** |

*Brookfield viscometer - LVF, Spindle 3, Speed 30, product temperature –40° F.
**Significantly different from Control at the 95% confidence level.

The results above indicate that the panel judged Sample #1, i.e., the maltitol-containing sample, as the creamiest of the three samples evaluated.

Example 2

No-oil Italian salad dressing samples were prepared having the following formulations:

TABLE III

| | Sample: | | |
|---|---|---|---|
| | Control | #1 | #2 |
| Water | 68.4 | 63.4 | 63.4 |
| Distilled white vinegar | 22.0 | 22.0 | 22.0 |
| Sugar | 5.0 | — | — |
| Salt | 1.9 | 1.9 | 1.9 |
| Onion power | 0.9 | 0.9 | 0.9 |
| Garlic powder | 0.5 | 0.5 | 0.5 |
| Xanthan gum (Keltrol T) | 0.5 | 0.5 | 0.5 |
| Red pepper pieces | 0.4 | 0.4 | 0.4 |
| Mustard flour | 0.2 | 0.2 | 0.2 |
| Ground white pepper | 0.1 | 0.1 | 0.1 |
| Whole oregano flakes | 0.1 | 0.1 | 0.1 |
| Maltitol | — | 10.0 | — |
| Sorbitol | — | — | 10.0 |
| | 100.0 | 100.0 | 100.0 |

These samples were then evaluated for viscosity and creaminess, and the results are set forth in the following table:

TABLE IV

| | Sample: | | |
|---|---|---|---|
| | Control | #1 | #2 |
| Viscosity* | 1448 | 1672 | 1304 |
| Creaminess (N = 8) (0–8, none to extensive) | 3.3 | 6.0** | 3.5 |

*Brookfield viscometer - LVF, Spindle 3, Speed 30, product temperature –40° F.
**Significantly different at 95% confidence level These results indicate that the panel judged the maltitol-containing sample, Sample #1, as creamier than both the control sample and the sorbitol-containing sample, Sample #2.

Example 3

Yellow cake samples were prepared from the following ingredients:

TABLE V

| | Sample: | | | |
|---|---|---|---|---|
| | Control | #1 | #2 | #3 |
| Part A | | | | |
| Sugar | 26.80 | — | 20.10 | 13.40 |
| Maltitol | — | 26.80 | 6.70 | 13.40 |
| Cake flour | 25.40 | 25.40 | 25.40 | 25.40 |
| Water | 14.85 | 14.85 | 14.85 | 14.85 |
| Creamtex | 12.00 | 12.00 | 12.00 | 12.00 |
| Whole milk powder | 0.65 | 0.65 | 0.65 | 0.65 |
| Salt | 0.60 | 0.60 | 0.60 | 0.60 |
| Part B | | | | |
| Water | 4.70 | 4.70 | 4.70 | 4.70 |
| Part C | | | | |
| Water | 10.00 | 10.00 | 10.00 | 10.00 |
| Whole egg powder | 3.50 | 3.50 | 3.50 | 3.50 |
| Baking powder | 1.20 | 1.20 | 1.20 | 1.20 |
| Vanilla extract (2X) | 0.30 | 0.30 | 0.30 | 0.30 |
| | 100.0 | 100.0 | 100.0 | 100.0 |

Each sample was prepared using standard technique. For example, first the ingredients of Part A, with the exception of water, were blended in a standard bowl. After blending, the water Part A was added, and this mixture was mixed for 5 to 6 minutes with a Hobart mixer, Speed 2. The mixture was scraped from the sides of the bowl, the water of Part B was added, and that mixture was mixed three minutes at Speed 2. All the ingredients of Part C were added, the mixture was mixed for four minutes at Speed 2, and then the mixture was scraped from the sides of the bowl. A quantity of 450 gm of the resulting mixture was baked in an 8×8 in. pan at 350° F. for 30 minutes.

The samples of cake were evaluated, with the following results:

TABLE VI

| | Sample: | | | |
|---|---|---|---|---|
| | Control | #1 | #2 | #3 |
| Density of Batter (gm/cc) | 0.77 | 0.84 | 0.79 | 0.78 |
| Residual Moisture (%) | 23.60 | 24.10 | 27.34 | 29.03 |
| Penetrometer | | | | |
| Center | 127 | 140 | 210 | 212 |
| Edge | 63 | 90 | 190 | 133 |
| Description of Texture | A | B | C | D |

A - Moist crumb, fine grain
B - Very moist, slight gumminess and mouthcoating
C - Moist crumb, fine grain
D - Slight gumminess, moist crumb Example 4

Yellow cakes were prepared according to the formulations set forth in the following table:

TABLE VII

| | Sample: | | |
|---|---|---|---|
| | Control | #1 | #2 |
| Water | 29.25 | 29.25 | 29.25 |
| Granulated sugar | 26.80 | 26.80 | 26.80 |
| Cake flour | 25.40 | 25.40 | 25.40 |
| Creamtex | 12.00 | 6.00 | 6.00 |
| Whole egg powder | 3.50 | 3.50 | 3.50 |
| Baking powder | 1.20 | 1.20 | 1.20 |
| Nonfat milk solids | 0.65 | 0.65 | 0.65 |
| Salt | 0.60 | 0.60 | 0.60 |
| Vanilla (2X) | 0.60 | 0.60 | 0.60 |
| Maltitol | — | 6.00 | — |
| Sorbitol | — | — | 6.00 |
| | 100.00 | 100.00 | 100.00 |

The cake samples were evaluated for weight loss and height, and the overall sensory acceptance was determined. The results were as follows:

TABLE VIII

| | Sample: | | |
|---|---|---|---|
| | Control | #1 | #2 |
| Percent weight loss from baking (%) | 12.16 | 13.35 | 12.00 |
| Height (mm) | | | |
| Center | 4.2 | 4.0 | 4.0 |
| Sides* | 2.5 | 2.3 | 1.8 |
| Overall Sensory Acceptance Score (N = 8) (0–8, very poor to excellent) | 6.0 | 5.5 | 4.0** |

*Average of four sides
**Significantly different at the 95% confidence level

The results indicate that Sample #1, the maltitol-containing cake, lost somewhat more weight during drying but was basically undistinguishable from the control sample. Sample #2, the sorbitol-containing product, was densest, as indicated by the height measurements, and driest, as indicted by the overall acceptance scores.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method of preparing a low-calorie, low-fat foodstuff, which comprises:

adding a maltitol composition as an ingredient when preparing the foodstuff as a substitute for at least a portion of a fat-containing ingredient, wherein the foodstuff is selected from the group consisting of brownies, cookies, pie filling, salad dressings, spreads, cakes, and powdered drink mixes, wherein the maltitol composition includes:

(a) from about 75 to 99% by weight maltitol, (b) from 0 to about 4% by weight of hydrogenated monosaccharide, (c) from about 1 to 11% by weight of hydrogenated trisaccharide, and (d) from about 0 to 10% by weight of hydrogenated tetrasaccharide and/or higher polysaccharides, based upon a total weight of the maltitol composition; and preparing the foodstuff including the maltitol composition.

2. The method of claim 1, wherein the maltitol composition is a composition comprising from about 88.5 to 99% by weight of maltitol, from 0 to about 3% by weight of hydrogenated monosaccharide, from about 1 to 9% by weight of hydrogenated trisaccharide, and from about 0 to 3% by weight of hydrogenated tetrasaccharide and/or higher polysaccharides, based upon the total weight of the composition.

3. The method of claim 1 or 2, wherein the foodstuff further includes from about 0.5 to 25% by weight, based upon a total weight of the foodstuff, of a sugar alcohol component.

4. The method of claim 3, wherein the sugar alcohol component comprises one or more sugar alcohols selected from the group consisting of xylitol, sorbitol, mannitol, hydrogenated glucose syrup (HGS), hydrogenated starch hydrolyzate (HSH), palatinit, and lactitol.

5. The method of claim 1, wherein the foodstuff further includes from about 0.5 to 30% by weight, based upon a total weight of the foodstuff, of a sugar component.

6. The method of claim 5, wherein the sugar component comprises one or more sugars selected from the group consisting of xylose, fructose, sucrose, maltose, lactose, isomaltose, isomalto-oligo-saccharide, isomaltulose (palatinose), high fructose corn syrup, corn syrup (maltodextrin), coupling sugar, fructo-oligo-saccharide, galacto-oligo-saccharide, and inverted sugar.

7. The method of claim 1, wherein the foodstuff further includes from about 0.01 to 20% by weight, based upon a total weight of the foodstuff, of an intense sweetener component.

8. The method of claim 7, wherein the intense sweetener component comprises one or more intense sweeteners selected from the group consisting of aspartame, alitame, acesulfame-K, trichlorosucrose (sucralose), stevioside, rebaudioside-A, and saccharine.

9. The method of claim 1, wherein the foodstuff further includes from about 0.1 to 25% by weight, based upon a total weight of the foodstuff, of polydextrose.

10. The method of claim 1, wherein the maltitol composition is present in an amount of from about 1 to 35% by weight, based upon a total weight of the foodstuff.

11. The method of claim 10, wherein the maltitol composition is present in an amount of from about 5 to 27% by weight, based upon a total weight of the foodstuff.

12. A method of preparing a low-calorie, low-fat foodstuff, which comprises:

adding a maltitol composition as an ingredient when preparing the foodstuff as a substitute for at least a portion of a fat-containing ingredient, wherein the maltitol composition is present in an amount of from about 1 to 35% by weight, based upon a total weight of the foodstuff, and wherein the maltitol composition includes:

from about 75 to 99% by weight of maltitol, (b) from 0 to about 4% by weight of hydrogenated monosaccharide, and (c) from about 0 to 10% by weight of hydrogenated tetrasaccharide and/or higher polysaccharides, based upon a total weight of the maltitol composition; and preparing the foodstuff including the maltitol composition.

13. A method of preparing a low calorie, low-fat foodstuff, comprising: adding a maltitol composition as an ingredient when preparing the foodstuff as a substitute for at least a portion of a fat-containing ingredient, wherein the maltitol composition includes from about 75 to 99% by weight of maltitol based upon a total weight of the maltitol composition, wherein the maltitol composition is present in an effective amount to at least partially replace the fat content of said foodstuff; and preparing the foodstuff including the maltitol composition, wherein the foodstuff, including the maltitol composition, has substantially the same organoleptic properties compared to the same foodstuff prepared using said fat-containing ingredient instead of said maltitol composition, to thereby obtain substantially the same mouthfeel in the low calorie, low-fat foodstuff as in the foodstuff prepared including the fat-containing ingredient.

14. The method according to claim 13, wherein the maltitol composition is added in an amount such that 50% of the fat-containing ingredient is replaced by said maltitol composition.

15. The method according to claim 13, wherein the maltitol composition is added in an amount such that all of the fat-containing ingredient is replaced by said maltitol composition.

16. A low calorie, low-fat foodstuff produced by the method according to claim 13.

17. A low calorie, fat free salad dressing, comprising fat free salad dressing ingredients and a maltitol composition containing from about 75 to 99% by weight of maltitol, said maltitol being present in said salad dressing in an effective amount to impart to said salad dressing substantially the same organoleptic properties compared to a salad dressing having a fat content.

18. A low-calorie, low-fat foodstuff prepared by the process of claim 1.

19. A low-calorie, low-fat foodstuff prepared by the process of claim 12.

* * * * *